(12) United States Patent
Tabata et al.

(10) Patent No.: US 6,713,039 B2
(45) Date of Patent: Mar. 30, 2004

(54) LITHIUM-MANGANESE OXIDE FOR USE IN LITHIUM SECONDARY CELL CATHODE AND METHOD FOR PRODUCING THE LITHIUM-MANGANESE OXIDE

(75) Inventors: Hiroyuki Tabata, Fukuoka-pref. (JP); Kazue Matsui, Fukuoka-pref. (JP); Noriko Anan, Fukuoka-pref. (JP)

(73) Assignee: Kyushu Ceramics Industry Co., Ltd., Fukuoka-pref. (JP)

( * ) Notice: Subject to any disclaimer, the term of this patent is extended or adjusted under 35 U.S.C. 154(b) by 0 days.

(21) Appl. No.: 09/894,756

(22) Filed: Jun. 28, 2001

(65) Prior Publication Data

US 2002/0044906 A1 Apr. 18, 2002

(30) Foreign Application Priority Data

Aug. 31, 2000 (JP) .......................... 2000-262784

(51) Int. Cl.$^7$ .......................... C01D 15/00; C01D 1/02; C01D 1/24; C01B 9/08
(52) U.S. Cl. .................. 423/643; 423/464; 423/594.15; 423/641; 429/224; 429/231.95
(58) Field of Search .............................. 429/224, 231.95; 423/464, 599, 641, 643

(56) References Cited

U.S. PATENT DOCUMENTS 5,674,645 A * 10/1997 Amatucci et al. ............ 429/224
6,087,042 A * 7/2000 Sugiyama et al. ........... 429/224

FOREIGN PATENT DOCUMENTS

JP           7254403   * 10/1995   ............ H01M/4/02

* cited by examiner

*Primary Examiner*—Stanley S. Silverman
*Assistant Examiner*—Jonas N. Strickland
(74) *Attorney, Agent, or Firm*—Jordan and Hamburg LLP

(57) ABSTRACT

A lithium-manganese oxide for use in a lithium secondary cell cathode, having a spinel structure expressed by a chemical compositional formula of $Li_xMn_2O_{4-z}F_z$ ($1.12 \leq X \leq 1.20$, $0 < Z < 0.16$) and having a lattice constant ranging from 8.220 to 8.230 Å, the lithium-manganese oxide including electrolytic or chemically synthesized manganese dioxide, lithium salt, and fluoride.

1 Claim, 3 Drawing Sheets

LITHIUM-MANGANESE OXIDE FOR USE IN LITHIUM SECONDARY CELL CATHODE AND METHOD FOR PRODUCING THE LITHIUM-MANGANESE OXIDE

BACKGROUND OF THE INVENTION

This invention relates to $Li_xMn_2O_{4-z}F_z$ of a spinel structure for use as a cathode active material in a lithium secondary cell and a method for producing $Li_xMn_2O_{4-z}F_z$, which lithium secondary cell uses an intercalation compound such as metallic lithium or lithium-graphite (lithium-carbon) as an anode active material.

The lithium secondary cell has been acknowledged to provide safety as well as a high energy density and high cyclability, and is now prevalent in a cellar phone market at an increasing rate. In addition, the same secondary cell has recently been promoted to come into practical service in the field of large-scaled batteries for use on electric vehicles and for use in distributed storage systems. In the past, the lithium secondary cell has typically employed $LiCoO_2$ as a cathode material. $LiCoO_2$ is able to absorbingly store and release lithium.

The above cobalt is costly and limited in resource amount, and would drain off in absolute amount when a demand for batteries continues to increase at a current speed and further when the large-scaled batteries are virtually brought into practical service. Therefore, earnest studies have been made all over the world to replace such a costly cathode material with manganese that is rich in resource and harmless to the environment. However, a lithium-manganese oxide characterized by high voltage and a high energy density has a drawback to charge-discharge cycle characteristics and, in particular, a short cycle life due to dissolution of manganese into electrolyte solution in a hot atmosphere.

SUMMARY OF THE INVENTION

In view of the above, an object of the present invention is to provide a lithium-manganese oxide for use in a lithium secondary cell cathode and a method for producing the lithium-manganese oxide, designed to allow a cathode active material to exhibit improved charge-discharge cycle characteristics.

The above object is achievable by the use of a lithium-manganese oxide for use in a lithium secondary cell cathode, having a spinel structure expressed by a chemical compositional formula of $Li_xMn_2O_{4-z}F_z$ ($1.12 \leq X \leq 1.20$, $0 < Z < 0.16$) and having a lattice constant ranging from 8.220 to 8.230 Å.

The method for producing the lithium-manganese oxide comprises the steps of: mixing electrolytic or chemically synthesized manganese dioxide, lithium salt, and fluoride together so as to reach a Li/Mn mole ratio of $0.56 \leq Li/Mn \leq 0.60$ and a F/Mn mole ratio of $0 < F/Mn < 0.08$; and thereafter subjecting the mixture to primary heat treatment at a temperature ranging from 400 to 600° C. and then to secondary heat treatment at a temperature falling within the range of 700 to 800° C. The lithium salt can be lithium nitrate, lithium hydroxide, or lithium carbonate.

DETAILED DESCRIPTION OF THE PREFERRED EMBODIMENTS

Figure 1:
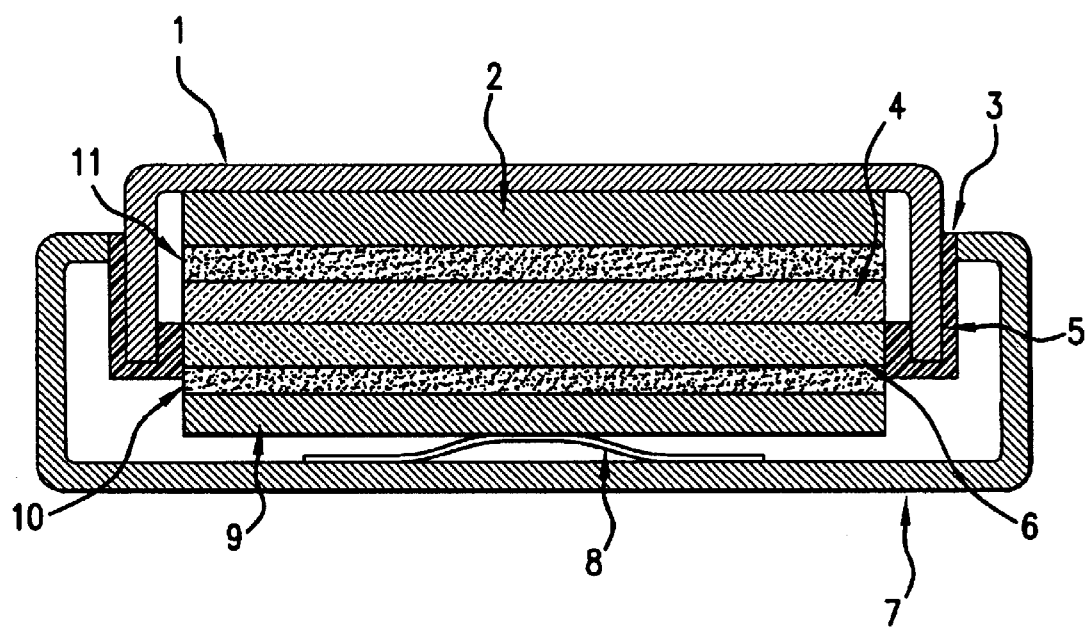
FIG. 1 is a cross-sectional view, illustrating a structure of a lithium secondary cell according to the present invention.

The present invention is designed to permit $Li_xMn_2O_4$ having a spinel structure to experience partial replacement of fluoride ions in order to restrain dissolution of manganese into electrolyte solution, thereby providing an improved charge-discharge cycle life. When "X" in $Li_xMn_2O_{4-z}F_z$ is less than 1.12, then the manganese dissolves into the electrolyte solution under the influence of $Mn^{3+}$ that has a reduced level of bonding strength, with a consequential increase in cycle degradation. When "X" in $Li_xMn_2O_{4-z}F_z$ is greater than 1.20, then cell capacity is rendered small, which is difficult to allow a lithium secondary cell to be put into practical use. When "X" in $Li_xMn_2O_{4-z}F_z$ lies within the range of $1.12 \leq X \leq 1.20$, then the cell capacity is increased by oxygen being replaced by fluorine; however, the cycle degradation occurs when "Z" in $Li_xMn_2O_{4-z}F_z$ is 0.16 or greater. A lattice constant less than 8.220 Å reduces the cell capacity, while a lattice constant greater than 8.230 Å increases the cycle degradation.

Next, the method for producing $Li_xMn_2O_{4-z}F_z$ will be described. Elements are compounded together at respective mole ratios (Li/Mn and F/Mn) in an attempt to be compositions of the above lithium-manganese oxide. A temperature for primary heat treatment must range from 400 to 600° C. in order to treat within a range of temperatures in which lithium nitrate, lithium hydroxide, or lithium carbonate are molten and dissolved. A temperature for secondary heat treatment must fall within the range of 700 to 800° C. in order to synthesize a spinel structure having a target lattice constant by the secondary heat treatment being practiced within such a temperature range. Any temperature range other than the above will results in inclusion of non-reactants such as $Mn_2O_3$, with concomitant impairment of cell characteristics.

In view of the above, electrolytic or chemically synthesized manganese dioxide, lithium salt, and fluoride are used as starting raw materials to achieve an uniform mixture both at a Li/Mn mole ratio of $0.56 \leq Li/Mn \leq 0.60$ and at a F/Mn mole ratio of $0 < F/Mn < 0.08$. A synthesized temperature greater than a molten temperature of the lithium salt causes the lithium salt to cover a surface in the form of liquid, and provides further improvements in uniform distribution of lithium and manganese than when these elements are mixed together, with the result of a solid-liquid reaction, formation of a spinel compound in a shorter time, and improved steerability. The spinel compound generated at this point has a single phrase according to X-ray diffraction (XRD), and is a compound having a cubic system lattice constant of 8.2 Å or smaller, rich in oxygen, and having small discharge capacity. Then, the secondary heat treatment at higher temperatures of 700 to 800° C. allows $Li_xMn_2O_{4-z}F_z$ having a target spinel construction to be synthesized in a short time.

When characteristics of the above-synthesized compound as a cathode active material for use in a secondary cell were evaluated, then $Li_xMn_2O_{4-z}F_z$ was found to be a cathode active material for use in the secondary cell, having high initial capacity and good cycle characteristics. It was further found that $Li_xMn_2O_{4-z}F_z$ yields a reduced degree of cycle degradation, even when the cell experiences repeated charge-discharge in an atmosphere in which $Li_xMn_2O_{4-z}F_z$ is retained at a high temperature (60° C.). It is believed that this is because addition of fluoride reduces a specific surface area and manganese is thereby restrained from being dissolved in a hot atmosphere.

Examples according to the present invention will now be described with reference to comparative examples.

EXAMPLE 1

Electrolytic manganese dioxide, lithium salt, and fluoride were mixed together at a Li/Mn mole ratio of 0.58 and at an F/Mn mole ratio of 0.02 before being introduced into an alumina container. This sample container was retained in an electric furnace at a molten temperature of the lithium salt for two hours, and was then maintained at a temperature of 750° C. for ten hours. As a result, $Li_xMn_2O_{4-z}F_z$ according to the present application was synthesized.

EXAMPLE 2

Treatment similar to that in Example 1 was made, except that secondary heat treatment was practiced for twenty hours, and then $Li_xMn_2O_{4-z}F_z$ according to the present application was synthesized.

EXAMPLE 3

Treatment similar to that in Example 1 was made, except for an F/Mn mole ratio of 0.04, and then $Li_xMn_2O_{4-z}F_z$ according to the present application was synthesized.

EXAMPLE 4

Treatment similar to that in Example 1 was practiced, except for an F/Mn mole ratio of 0.04, primary heat treatment for fourteen hours, and secondary heat treatment for twenty four hours. As a result, $Li_xMn_2O_{4-z}F_z$ according to the present application was synthesized.

COMPARATIVE EXAMPLE 1

Treatment similar to that in Example 4 was executed, except for a Li/Mn mole ratio of 0.55, and then $Li_xMn_2O_{4-z}F_z$ was synthesized.

COMPARATIVE EXAMPLE 2

Treatment similar to that in Example 4 was made, except for a Li/Mn mole ratio of 0.52, and then $Li_xMn_2O_{4-z}F_z$ was synthesized.

COMPARATIVE EXAMPLE 3

Electrolytic manganese dioxide and lithium salt were mixed together at a Li/Mn mole ratio of 0.58 before being introduced into the alumina container. This sample container was retained in the electric furnace at a molten temperature of the lithium salt for fourteen hours, and was then cooled down to a room temperature in one hour before the sample was taken out of the container. The sample was smashed into pieces, and was then mixed together. The mixed sample pieces were again retained in the electric furnace at a secondary heat treatment temperature of 750° C. for twenty four hours. As a result, $Li_xMn_2O_4$ was synthesized as a comparative example.

COMPARATIVE EXAMPLE 4

Treatment similar to that in Example 3 was effected, except for a Li/Mn mole ratio of 0.55, and then $Li_xMn_2O_4$ was synthesized as a comparative example.

COMPARATIVE EXAMPLE 5

Treatment similar to that in Example 3 was made, except for a Li/Mn mole ratio of 0.52, and then $Li_xMn_2O_4$ was synthesized as a comparative example.

A lithium secondary cell of a type 2032 coin cell was used for measurement, and was built in a dry box under an argon atmosphere. In FIG. 1, reference numerals 1 denote a case toward a cathode; 2 a cathode current collector; 3 a gasket; 4 and 6 glass filter paper sheets; 5 a separator; 7 a case toward an anode; 8 a spring; 9 an anode current collector; 10 metallic lithium; and, 11a cathode mix. An electrically conductive binder of 16 mg was added to the resulting lithium-manganese oxide of 20 mg, thereby providing the cathode mix in the form of a film, which was then pressed against a stainless plate. $LiPF_6$ (1 mol/l) dissolved in ethylene carbonate and 1,2-dimethoxyethane(1:1) was used as electrolyte solution. The cell containing such electrolyte solution was repeatedly charged and discharged using a 2 mA current having a voltage ranging from 4.3 to 3.0 V. A fixed temperature container left in a room and having a constant temperature of 60° C. was used as one of temperature conditions. Table 1 illustrates initial discharge capacity and respective capacity retention percentages with reference to the initial discharge capacity both at a room temperature at the point of 50 cycles and at a temperature of 60° C. at the point of 50 cycles. The discharge capacity in Table 1 shows values for one gram of the cathode active material.

TABLE 1

|  | Capacity mAh/g | Room Temperature Retention Percentage % | 60° C. Retention Percentage % | Lattice Constant Å | X | Z |
| --- | --- | --- | --- | --- | --- | --- |
| Example 1 | 112 | 98 | 92 | 8.225 | 1.17 | 0.03 |
| Example 2 | 110 | 98 | 93 | 8.224 | 1.16 | 0.04 |
| Example 3 | 116 | 96 | 89 | 8.230 | 1.16 | 0.08 |
| Example 4 | 119 | 96 | 88 | 8.229 | 1.15 | 0.08 |
| Comparative Example 1 | 118 | 94 | 86 | 8.231 | 1.10 | 0.07 |
| Comparative Example 2 | 121 | 94 | 87 | 8.235 | 1.04 | 0.08 |
| Comparative Example 3 | 103 | 96 | 85 | 8.218 | 1.17 | 0 |

TABLE 1-continued

|  | Capacity mAh/g | Room Temperature Retention Percentage % | 60° C. Retention Percentage % | Lattice Constant Å | X | Z |
|---|---|---|---|---|---|---|
| Comparative Example 4 | 125 | 93 | 75 | 8.235 | 1.09 | 0 |
| Comparative Example 5 | 124 | 94 | 72 | 8.238 | 1.03 | 0 |

As illustrated in Table 1, $Li_xMn_2O_{4-z}F_z$ synthesized by the fluoride being mixed with the starting raw material provided higher levels of capacity retention percentages than those in the comparative examples, and particularly exhibited good characteristics at high temperature. This result influences a lithium-manganese ratio and a lattice constant. (See Comparative Examples 1 and 2.)

Figure 2:
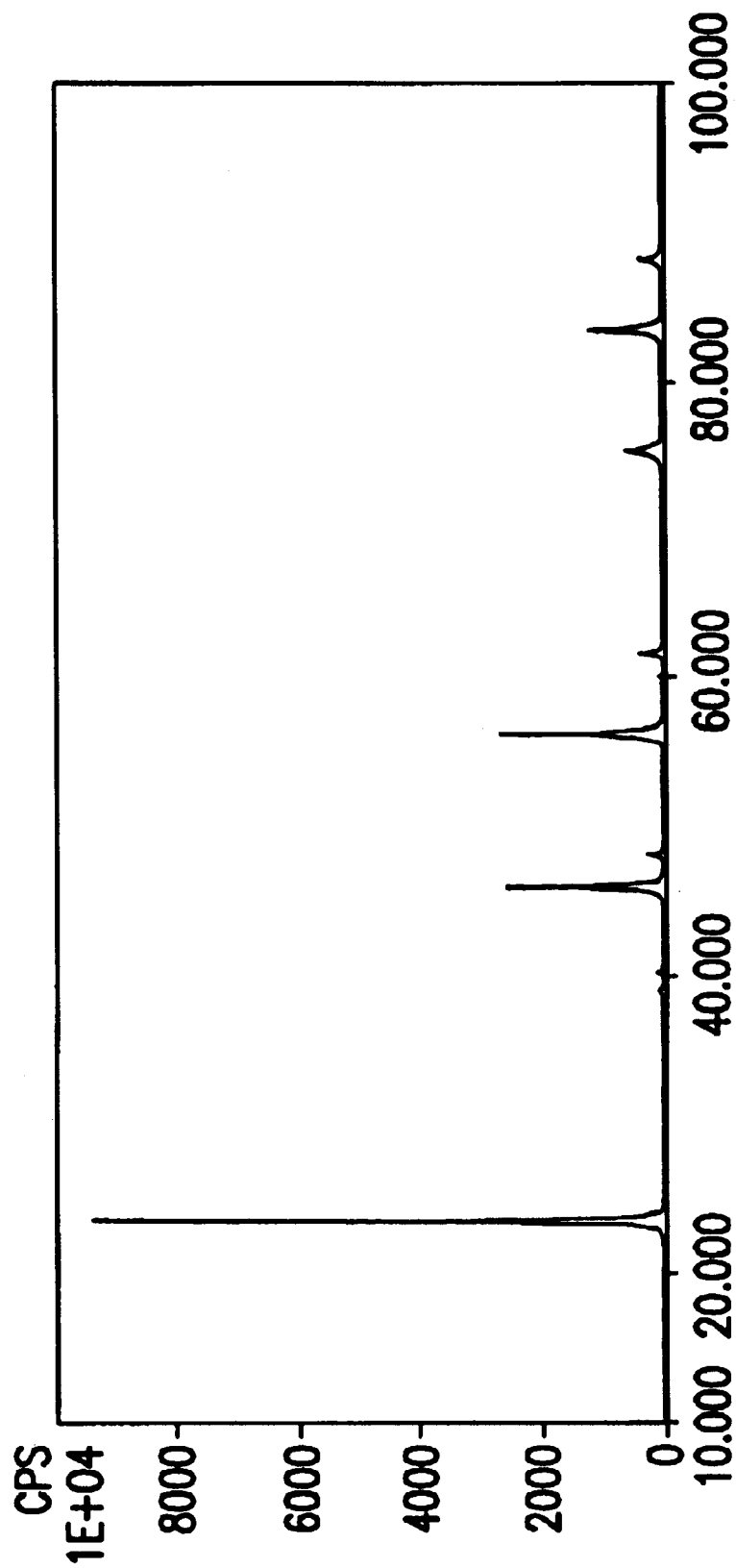
FIG. 2 is a graph, illustrating X-ray diffraction of $Li_xMn_2O_{4-z}F_z$ according to the present invention.
Figure 3:
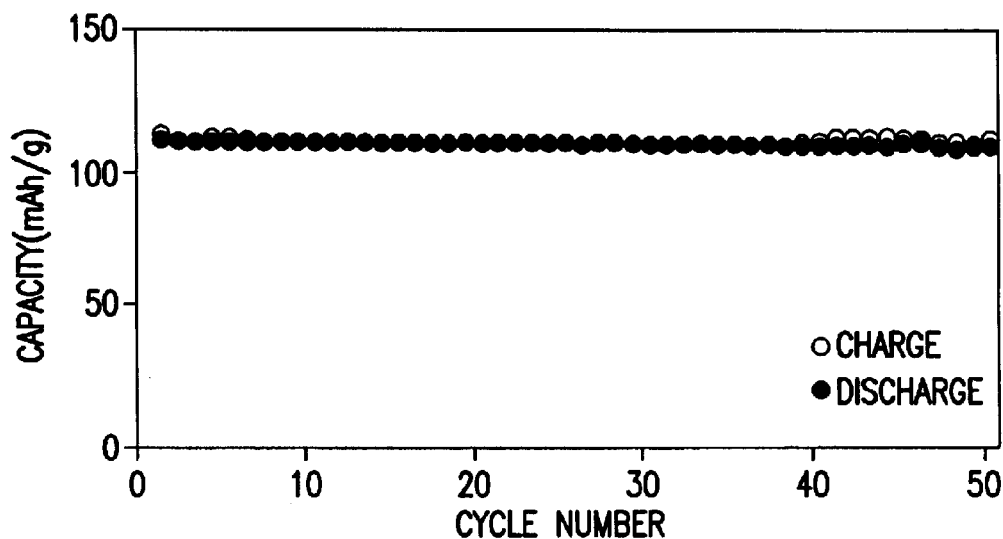
FIG. 3 is a graph, illustrating a relationship between a cycle number and room temperature charge-discharge capacity of $Li_xMn_2O_{4-z}F_z$ according to the present invention; and, FIG. 4 is a graph, illustrating a relationship between a cycle number and 60° C. charge-discharge capacity of $Li_xMn_2O_{4-z}F_z$ according to the present invention.
Figure 4:
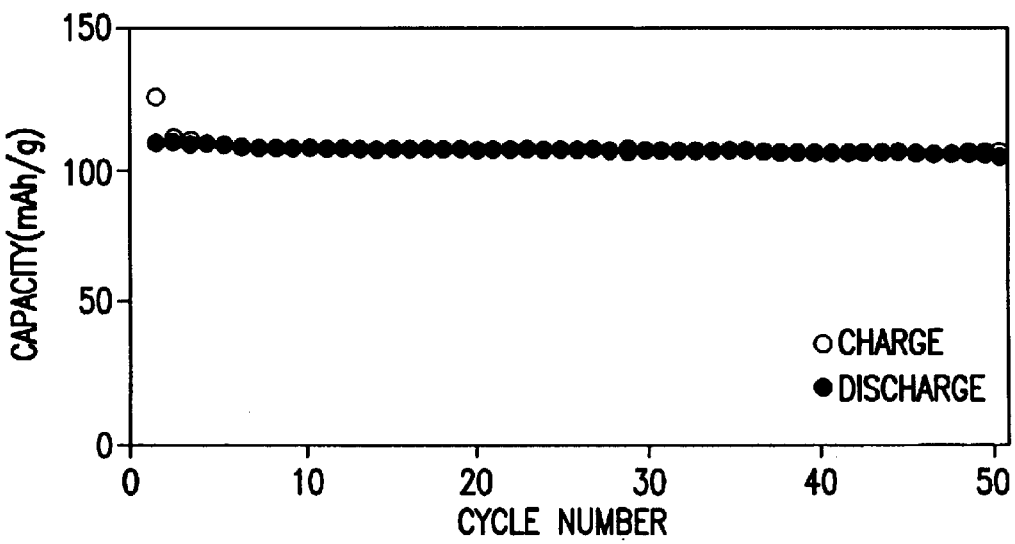

FIGS. 2, 3, and 4 illustrate X-ray diffraction in Example 1, charge-discharge cycle capacity at a room temperature, and charge-discharge cycle capacity at a temperature of 60° C., respectively.

As described above, the present invention demonstrates charge-discharge cycle characteristics and, in particular, cycle stability in a hot atmosphere, and may be applicable to electric vehicles that are promoted to come into practical service in consideration of environmental and energy problems. Therefore, the present invention is of considerable significance to subsequently developed lithium secondary cells.

What is claimed is:

1. A method for producing a lithium-manganese oxide for use in a lithium secondary cell cathode, comprising the steps of: mixing electrolytic or chemically synthesized manganese dioxide, lithium salt, and fluoride together so as to reach a Li/Mn mole ratio of 0.56≦Li/Mn>0.60 and a F/Mn mole ratio of 0<F/Mn<0.08; and thereafter subjecting the above mixture to primary heat treatment at a temperature ranging from 400° C. to 600° C. for a period of from two to fourteen hours and then to secondary heat treatment at a temperature ranging from 700° C. to 800° C. for a period of from ten to twenty-four hours.

* * * * *